US009189615B2

(12) United States Patent
Tumanyan

(10) Patent No.: US 9,189,615 B2
(45) Date of Patent: Nov. 17, 2015

(54) SYSTEMS AND METHODS FOR SYSTEM LOGIN AND SINGLE SIGN-ON

(75) Inventor: Hovhannes Tumanyan, Redwood City, CA (US)

(73) Assignee: Openlane, Inc., Redwood City, CA (US)

( * ) Notice: Subject to any disclaimer, the term of this patent is extended or adjusted under 35 U.S.C. 154(b) by 0 days.

(21) Appl. No.: 13/096,389

(22) Filed: Apr. 28, 2011

(65) Prior Publication Data

US 2012/0023565 A1 Jan. 26, 2012

Related U.S. Application Data

(60) Provisional application No. 61/328,921, filed on Apr. 28, 2010.

(51) Int. Cl.
*G06F 21/41* (2013.01)
*H04L 29/06* (2006.01)

(52) U.S. Cl.
CPC ............ *G06F 21/41* (2013.01); *H04L 63/0815* (2013.01); *G06F 2221/2103* (2013.01); *G06F 2221/2117* (2013.01)

(58) Field of Classification Search
CPC .................... H04L 63/0815; G06F 2221/2117
USPC ...................................................... 726/1, 4, 8
See application file for complete search history.

(56) References Cited

U.S. PATENT DOCUMENTS

| | | | |
|---|---|---|---|
| 4,774,664 | A | 9/1988 | Campbell et al. |
| 5,764,628 | A | 6/1998 | Davis et al. |
| 5,774,873 | A | 6/1998 | Berent et al. |
| 5,794,219 | A | 8/1998 | Brown |
| 5,812,070 | A | 9/1998 | Tagami et al. |
| 5,818,914 | A | 10/1998 | Fujisaki |
| 5,835,236 | A | 11/1998 | Barbari |

(Continued)

FOREIGN PATENT DOCUMENTS

| | | | |
|---|---|---|---|
| GB | WO2010076550 | * | 12/2009 |
| IN | WO2008124365 | * | 10/2008 |

(Continued)

OTHER PUBLICATIONS

Catugno, "Achieving Interoperability between Federated Identity Management Systems: A case study", Journal of High Speed Networks, 2014, p. 209-221.*

(Continued)

*Primary Examiner* — Taghi Arani
*Assistant Examiner* — Gregory Lane
(74) *Attorney, Agent, or Firm* — Brinks Gilson & Lione

(57) ABSTRACT

Systems and methods for system login and single sign-on are described. A first application of a first system receives a request to access a protected application of a second system. An assertion is generated in response to the request. The assertion asserts an identity in the first system of a user generating the request. The assertion is validated and first account information corresponding to the assertion is extracted. The first account information is information of a first account of the user in the first system. Second account information is determined that is information of a second account of the user in the second system. A mapping is generated between the first account and the second account using the first account information and the second account information. The mapping is used to provide access to the protected application by the requestor.

44 Claims, 4 Drawing Sheets

(56) References Cited

U.S. PATENT DOCUMENTS

| | | | | |
|---|---|---|---|---|
| 5,835,896 | A | 11/1998 | Fisher et al. | |
| 5,856,931 | A | 1/1999 | McCasland | |
| 5,857,159 | A | 1/1999 | Dickrell et al. | |
| 5,890,138 | A | 3/1999 | Godin et al. | |
| 5,905,974 | A | 5/1999 | Fraser et al. | |
| 5,905,975 | A | 5/1999 | Ausubel | |
| 5,915,209 | A | 6/1999 | Lawrence | |
| 5,966,699 | A | 10/1999 | Zandi | |
| 5,978,776 | A | 11/1999 | Seretti et al. | |
| 6,006,148 | A | 12/1999 | Strong | |
| 6,006,201 | A | 12/1999 | Berent et al. | |
| 6,012,045 | A | 1/2000 | Barzilai et al. | |
| 6,021,398 | A | 2/2000 | Ausubel | |
| 6,023,685 | A | 2/2000 | Brett et al. | |
| 6,023,687 | A | 2/2000 | Weatherly et al. | |
| 6,026,163 | A | 2/2000 | Micali | |
| 6,038,597 | A | 3/2000 | Van Vyngarden | |
| 6,041,310 | A | 3/2000 | Green et al. | |
| 6,049,784 | A | 4/2000 | Weatherly et al. | |
| 6,055,518 | A | 4/2000 | Franklin et al. | |
| 6,061,789 | A | 5/2000 | Hauser et al. | |
| 6,151,589 | A | 11/2000 | Aggarwal et al. | |
| 6,161,099 | A | 12/2000 | Harrington et al. | |
| 6,167,384 | A | 12/2000 | Graff | |
| 6,202,051 | B1 | 3/2001 | Woolston | |
| 6,243,691 | B1 | 6/2001 | Fisher et al. | |
| 6,266,652 | B1 | 7/2001 | Godin et al. | |
| 6,269,395 | B1 | 7/2001 | Blatherwick et al. | |
| 6,292,788 | B1 | 9/2001 | Roberts et al. | |
| 6,298,333 | B1 | 10/2001 | Manzi et al. | |
| 6,347,302 | B1 | 2/2002 | Joao | |
| 6,381,587 | B1 | 4/2002 | Guzelsu | |
| 6,385,730 | B2 | 5/2002 | Garrison | |
| 6,397,337 | B1 | 5/2002 | Garrett et al. | |
| 6,397,356 | B1 | 5/2002 | Yonezawa | |
| 6,430,488 | B1 | 8/2002 | Goldman et al. | |
| 6,449,601 | B1 | 9/2002 | Friedland et al. | |
| 6,470,324 | B1 | 10/2002 | Brown et al. | |
| 6,480,854 | B1 | 11/2002 | Gross et al. | |
| 6,502,080 | B1 | 12/2002 | Eichorst et al. | |
| 6,529,952 | B1 | 3/2003 | Blumenau | |
| 6,539,482 | B1 | 3/2003 | Blanco et al. | |
| 6,560,580 | B1 | 5/2003 | Fraser et al. | |
| 6,606,608 | B1 | 8/2003 | Bezos et al. | |
| 6,609,108 | B1 | 8/2003 | Pulliam et al. | |
| 6,611,728 | B1 | 8/2003 | Morioka et al. | |
| 6,622,129 | B1 | 9/2003 | Whitworth | |
| 6,678,731 | B1 | 1/2004 | Howard et al. | |
| 6,694,365 | B1 | 2/2004 | Wyngarden | |
| 6,697,806 | B1 | 2/2004 | Cook | |
| 6,725,201 | B2 | 4/2004 | Joao | |
| 6,735,573 | B1 | 5/2004 | Gelman et al. | |
| 6,745,225 | B2 | 6/2004 | Loh et al. | |
| 6,751,546 | B2 | 6/2004 | Yamashita | |
| 6,754,564 | B2 | 6/2004 | Newport | |
| 6,768,935 | B1 | 7/2004 | Morgan et al. | |
| 6,785,658 | B1 | 8/2004 | Merker et al. | |
| 6,813,612 | B1 | 11/2004 | Rabenold et al. | |
| 6,819,218 | B2 | 11/2004 | Mabuchi et al. | |
| 6,865,566 | B2 | 3/2005 | Serrano-Morales et al. | |
| 6,920,433 | B1 | 7/2005 | Seretti et al. | |
| 6,980,963 | B1 | 12/2005 | Hanzek | |
| 7,103,568 | B1 | 9/2006 | Fusz et al. | |
| 7,363,246 | B1 | 4/2008 | Van Horn et al. | |
| 7,409,361 | B2 | 8/2008 | Dinwoodie | |
| 7,430,517 | B1 | 9/2008 | Barton | |
| 7,480,550 | B2 | 1/2009 | Huber et al. | |
| 7,506,162 | B1 * | 3/2009 | Hsu et al. | 713/168 |
| 7,908,180 | B2 | 3/2011 | Goclowski | |
| 7,921,052 | B2 | 4/2011 | Dabney et al. | |
| 2001/0044751 | A1 | 11/2001 | Pugliese et al. | |
| 2001/0056396 | A1 | 12/2001 | Goino | |
| 2002/0002475 | A1 | 1/2002 | Freedman | |
| 2002/0023537 | A1 | 2/2002 | Ridgeway et al. | |
| 2002/0049663 | A1 | 4/2002 | Kahana | |
| 2002/0082978 | A1 | 6/2002 | Ghouri et al. | |
| 2002/0111877 | A1 | 8/2002 | Nelson | |
| 2002/0143646 | A1 | 10/2002 | Boyden et al. | |
| 2002/0186144 | A1 | 12/2002 | Meunier | |
| 2003/0004806 | A1 | 1/2003 | Vaitekunas | |
| 2003/0036964 | A1 | 2/2003 | Boyden et al. | |
| 2003/0120509 | A1 | 6/2003 | Bruch et al. | |
| 2003/0130952 | A1 | 7/2003 | Bell et al. | |
| 2003/0158806 | A1 | 8/2003 | Hanley et al. | |
| 2004/0107160 | A1 | 6/2004 | Goclowski | |
| 2004/0117293 | A1 | 6/2004 | Lammle et al. | |
| 2004/0128224 | A1 | 7/2004 | Dabney et al. | |
| 2004/0172266 | A1 | 9/2004 | Sheinson et al. | |
| 2005/0021444 | A1 | 1/2005 | Bauer et al. | |
| 2005/0038758 | A1 | 2/2005 | Hilbush et al. | |
| 2005/0065853 | A1 | 3/2005 | Ferreira | |
| 2005/0080712 | A1 | 4/2005 | Bauer et al. | |
| 2005/0125330 | A1 | 6/2005 | Dinwoodie | |
| 2005/0228736 | A1 | 10/2005 | Norman et al. | |
| 2005/0256780 | A1 | 11/2005 | Eldred | |
| 2006/0074790 | A1 | 4/2006 | Anspach | |
| 2006/0206408 | A1 | 9/2006 | Nassiri | |
| 2006/0265235 | A1 | 11/2006 | Schuchardt et al. | |
| 2007/0179860 | A1 | 8/2007 | Romero | |
| 2007/0226081 | A1 | 9/2007 | Vilcauskas et al. | |
| 2008/0016232 | A1 * | 1/2008 | Yared et al. | 709/229 |
| 2008/0021997 | A1 * | 1/2008 | Hinton | 709/225 |
| 2008/0046984 | A1 * | 2/2008 | Bohmer et al. | 726/5 |
| 2008/0300962 | A1 | 12/2008 | Cawston et al. | |
| 2009/0048942 | A1 | 2/2009 | Bouwens et al. | |
| 2011/0093923 | A1 * | 4/2011 | Yau et al. | 726/4 |
| 2011/0208783 | A1 * | 8/2011 | Dolphin et al. | 707/800 |
| 2011/0225637 | A1 * | 9/2011 | Counterman | 726/7 |

FOREIGN PATENT DOCUMENTS

| | | | |
|---|---|---|---|
| WO | WO 2007/009003 | A2 | 1/2007 |
| WO | WO 2007/009003 | A3 | 1/2007 |

OTHER PUBLICATIONS

Form PCT/ISA/220, PCT/US06/27088, "PCT Notification of Transmittal of The International Search Report and the Written Opinion of the International Searching Authority, or the Declaration," 1 pg.
Form PCT/ISA/210, PCT/US06/27088, "PCT International Search Report," 2 pgs.
Form PCT/ISA/237, PCT/US06/27088, "PCT Written Opinion of the International Searching Authority," 4 pgs.
Form PCT/IB/373, PCT/US06/27088, "PCT International Preliminary Report on Patentability," 1 pg.
Collins English Dictionary, Harper Collins Publishing 2000.
UPS Domestic Delivery Area Surcharge: http://web.archive.org/web/20050404012352/www.ups.com/content/us/en/shipping/cost/zones/on_demand.html (dated Apr. 4, 2005; Domestic Delivery Area Surcharge Chart dated Jan. 3, 2005) [retrieved from Internet Archive on Dec. 14, 2009].
UPS Payment Methods: http://web.archive.org/web/20050519002823/www.ups.com/content/us/en/resources/pay/methods.html (dated May 19, 2005) [retrieved from Internet Archive on Dec. 15, 2009].
AutoTradeCenter, 2004: http://web.archive.org/web/20050125180848/http://autotradecenter.com/.
PCT/US10/37797; PCT/ISA/220 "Notification of Transmittal of The International Search Report and the Written Opinion of the International Searching Authority, or the Declaration," 1 pg.
PCT/US10/37797; PCT/ISA/210 "International Search Report," 2 pgs.
PCT/US10/37797; PCT/ISA/237 "Written Opinion of the International Searching Authority," 5 pgs.
Form PCT/ISA/220, PCT/US10/25759, "PCT Notification of Transmittal of The International Search Report and the Written Opinion of the International Searching Authority, or the Declaration," 1 pg.
Form PCT/ISA/210, PCT/US10/25759, "PCT International Search Report," 2 pgs.
Form PCT/ISA/237, PCT/US10/25759, "PCT Written Opinion of the International Searching Authority," 8 pgs.

* cited by examiner

SYSTEMS AND METHODS FOR SYSTEM LOGIN AND SINGLE SIGN-ON

RELATED APPLICATIONS

This application claims the benefit of U.S. Patent Application No. 61/328,921, filed Apr. 28, 2010.

This application is related to U.S. patent application Ser. Nos. 11/457,068, 11/457,074, 11/457,077, 11/681,727, 11/681,729, 11/685,120, and 11/685,121.

TECHNICAL FIELD

Embodiments are described relating to electronic systems and, more particularly, to accessing sensitive data hosted in electronic systems.

BACKGROUND

Many processing systems include sensitive data that is exposed when users access and manipulate the sensitive data and/or applications corresponding to the data. In order to ensure adequate protection of this sensitive data as well as the information provided by those that own and access that data, the host processing systems enforce access control policies or rules based on the identities of the users who access the data or applications corresponding to the data.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Systems and methods are described herein for system login and single sign-on. A first application of a first system receives a request to access a protected application of a second system. An assertion is generated in response to the request. The assertion asserts an identity in the first system of a user generating the request. The assertion is validated and first account information corresponding to the assertion is extracted. The first account information is information of a first account of the user in the first system. Second account information is determined that is information of a second account of the user in the second system. A mapping is generated between the first account and the second account using the first account information and the second account information. The mapping is used to provide access to the protected application by the requestor.

Embodiments described herein include access control systems and methods that enforce strict access control policies based on identities of users who access data and/or applications hosted on processing systems. The access control systems and methods, referred to herein as "system login and single sign-on," include login and single sign-on systems and methods that authenticate users and enable single sign-on interoperation with partner and consignor systems.

In the following description, a number of features are described in detail in order to provide a more thorough understanding of the embodiments described herein. It is apparent that these embodiments may be practiced without these specific details. In other cases, well known features have not been described in detail.

Figure 1:
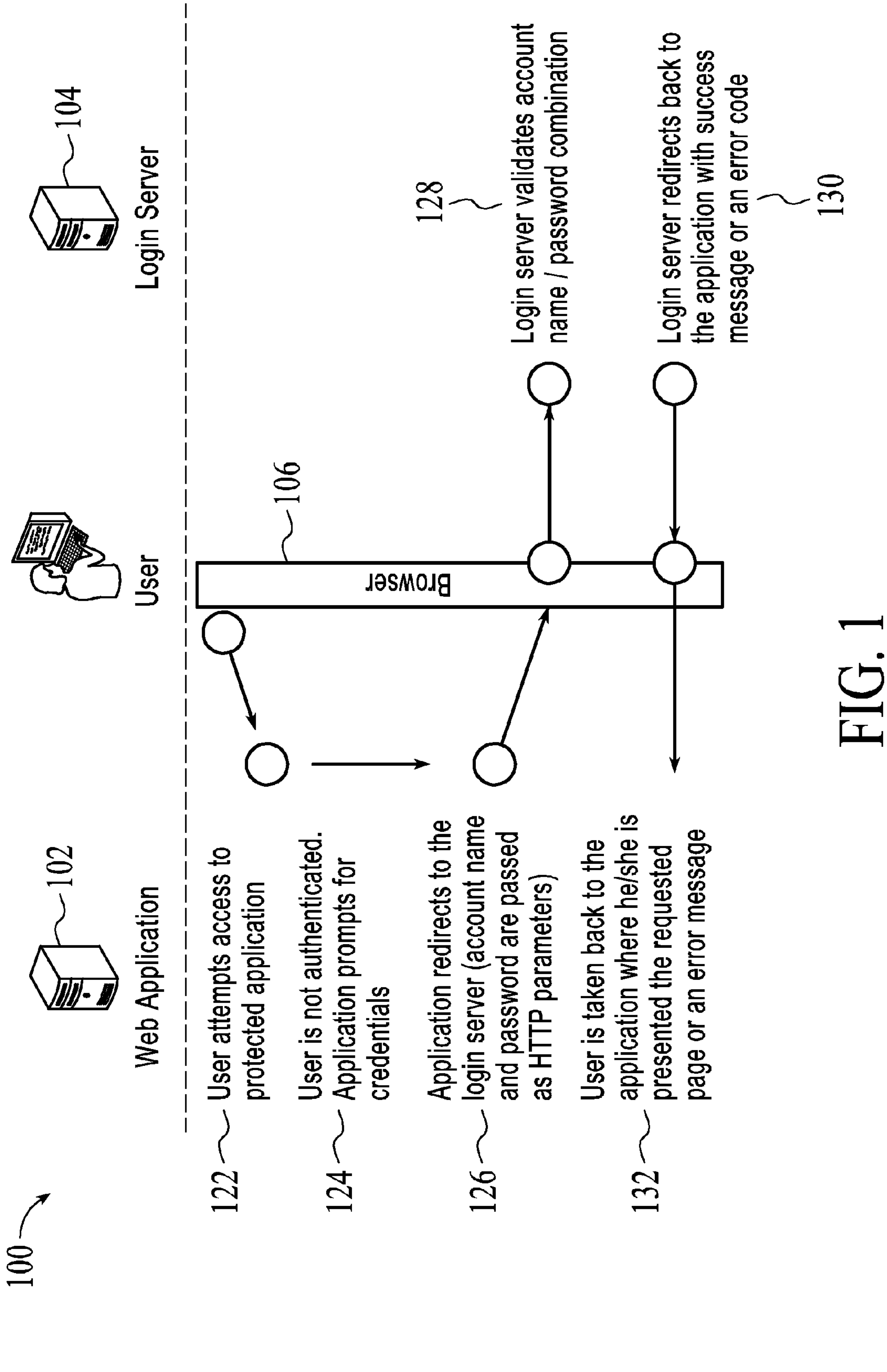
FIG. 1 is a flow diagram for a login protocol between an application (e.g., web application) and a login server during a login event to a host system, under an embodiment.

FIG. 1 is a flow diagram for a login protocol 100 between an application 102 (e.g., web application) and a login server 104 during a login event to a host system, under an embodiment. The communication between the application 102 and the centralized login server 104 is facilitated using HTTP protocol, for example, but is not so limited. The login server 104 is a component of or, alternatively, coupled or connected to a host system that includes sensitive data and/or applications and, as such, protects the data and/or applications from unauthorized access. Generally, to access sensitive data in the host systems users are required to authenticate with an account name and password. This user authentication is performed in the centralized login server 104, which validates user supplied passwords against user records stored in the host system database. The user records stored in the host system database include, for example, passwords stored in irreversibly obfuscated form. Upon successful authentication users are issued a secure token that includes their identity as certified by the centralized login server 104. The token of an embodiment is valid not only for accessing the application for which it was issued but also other applications of the host system. The duration of token validity varies based on authentication policies effective at the time of token issuance.

More specifically, the login protocol 100 of an embodiment comprises an attempt 122 by a user 101 to access one or more protected applications 102 and/or data of the host system. In an embodiment the application 102 is a web application and the user accesses the web application 102 via a browser 106, but the embodiment is not so limited. If the user is not authenticated, the application 102 prompts the user for credentials 124. Credentials, also referred to as account information, include user name or account name and password, for example, but are not so limited. When, in response to the prompt for credentials, the application 102 receives credentials or account information inputted by the user at the browser 106, the application 102 redirects 126 to the login server 104 and passes the received credentials to the login server 104. The account name and password can be passed to the login server as HTTP parameters, but are not so limited. In response to receipt of the credentials, the login server 104 validates 128 the credentials (e.g., validates the account name and password combination). Following validation 128 of the credentials, the login server 104 redirects back to the application 102 with a success message 130. In response to receipt of the success message 132 by the application 102, the user is taken back to the application and presented the requested page.

In the event the login server 104 is unable to validate the credentials, the login server 106 redirects back to the application 102 with an error message 132. In response to receipt of the error message by the application 102, the user is presented the error message.

The login protocol of an embodiment includes the use of Security Assertion Markup Language (SAML). SAML is an open standard for exchange of identity information across system and organization boundaries. The SAML standard is maintained and developed by OASIS. Detailed documentation on SAML as well as related technologies and solutions can be found at the OASIS web site (http://www.oasis-open.org) or at a resource dedicated to SAML and maintained by OASIS (http://saml.xml.org).

A single sign-in login protocol of an embodiment comprises SAML and, as such, identifies two types of interacting parties. The two types of interacting parties include an identity provider (IdP) and a service provider (SP). Identity providers are often referred to as "asserting parties" because they validate the identity of the user attempting to access the protected resource and "assert" that identity to the service provider. The service provider, also referred to as the "relying party," provides the requested resource or application function to the requesting user.

Figure 2:
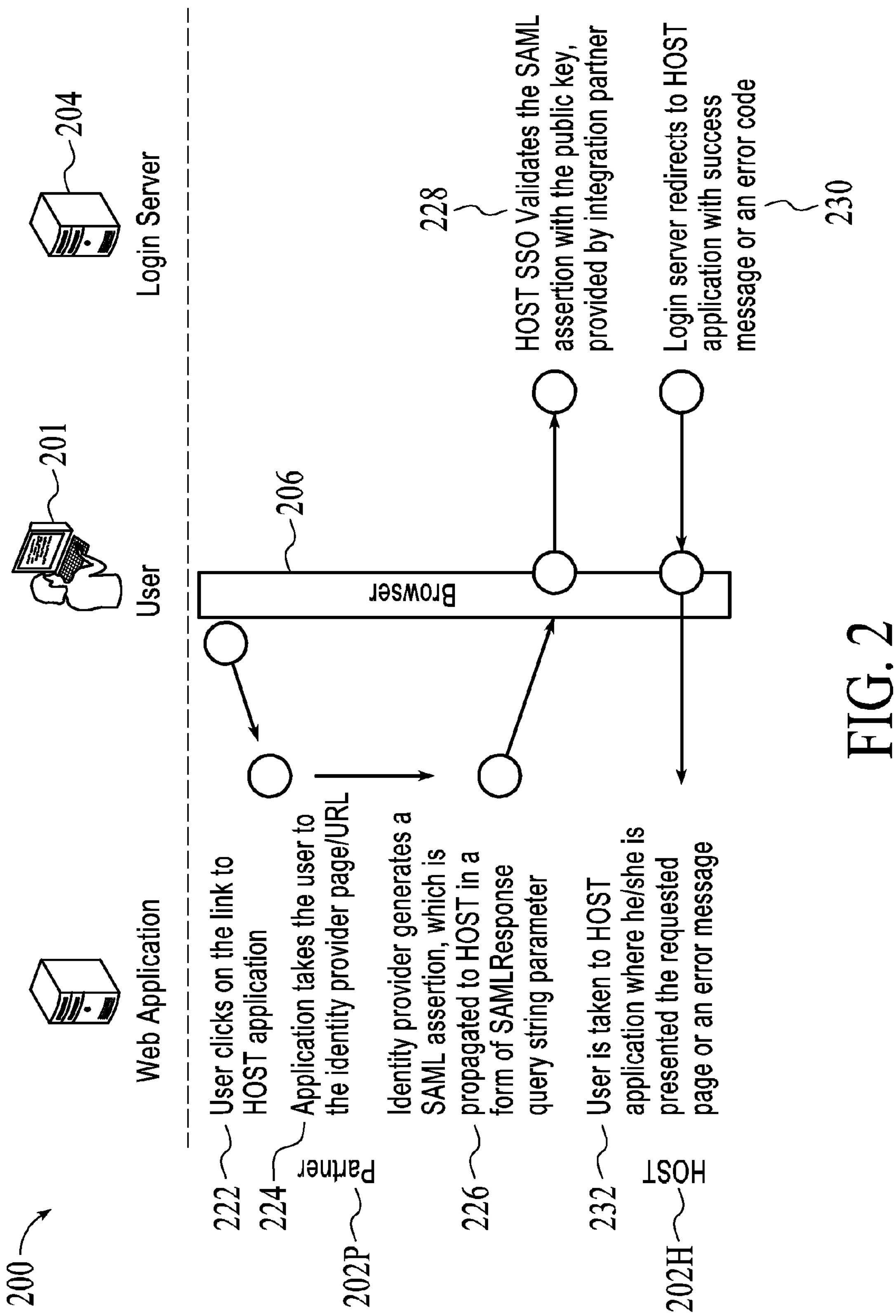
FIG. 2 is a flow diagram for a single sign-in login protocol between a user, a partner system application (e.g., web application), a host system application (e.g., web application), and a login server during a login event to a host system, under an embodiment.

FIG. 2 is a flow diagram for a single sign-in login protocol 200 between a user 201, a partner system application 202P (e.g., web application), a host system application 202H (e.g., web application), and a login server 204 during a login event to a host system, under an embodiment. The login server 204 is a component of or, alternatively, coupled or connected to a host system that includes sensitive data and/or applications and, as such, protects the data and/or applications from unauthorized access.

Generally, upon receipt of a digitally signed token (e.g., SAMLResponse token) during the login process, the login protocol of an embodiment validates the token using a public key of the partner platform through which the user is accessing the host system. Upon successful validation of the token, the user's unique identifier in the partner system is extracted. The unique identifier of an embodiment is the account name used to access the partner system, but is not so limited. The single sign-in login protocol also maps the identifier in the partner system to account credentials (e.g., account name) in the host system, as described in detail below. When the token is not validated the single sign-on process is immediately terminated.

More specifically, the single sign-in login protocol 200 of an embodiment comprises a user 201 navigating to an application 202P of the partner system and selecting a link 222 to a host system application 202H. The host system application 202H to which the user 201 is attempting access is a protected application and/or data of the host system. In an embodiment the partner system application 202P and host system application 202H are web applications and the user 201 accesses the web applications via a browser 206, but the embodiment is not so limited.

In response to selection of the link to the host system, the partner system application 202P takes the user to an identity provider page 224 (e.g., uniform resource locator (URL). The identity provider 224 generates a SAML assertion 226, and propagates the SAML assertion to the login server 204 using a SAMLResponse query string parameter. Upon receiving the SAMLResponse query string parameter, which is a digitally signed token, the login server 204 validates the SAML assertion 228 using a public key provided by the partner system application 202P through which the user is accessing the host system. Following validation 228 of the SAML assertion the login server 204 redirects 230 back to the partner system application 202P with a success message. In response to receipt of the success message by the partner system application 202P, the user is taken to the host system application 202H and presented the requested page 232.

In the event the login server 204 is unable to validate the SAML assertion, the login server 204 redirects back to the partner system application 202P with an error message. In response to receipt of the error message by the partner system application 202P, the user is presented the error message.

As described above, the single sign-in login protocol extracts the user's unique identifier in the partner system, and maps the identifier to account credentials (e.g., account name) in the host system. Generally, mapping, which is described herein to include the logical connection between user identities in various partnering systems, in a conventional system relies on data feeds, back end services or other means of out-of-band communication, which are inherently unreliable. Partnering systems that use mapping exchange the information associated with user accounts with the goal of finding matches and, ultimately, determining whether accounts belong to the same person. Matching is typically performed based on information like first and last names, addresses, and phone numbers to name a few. While reliable address or name matching is easily done by humans for small numbers of account pairs, automated matching of large number of pairs is challenging and unreliable as a result of, for example, different spelling of human names or street names and/or variations of zip code representation, which complicates implementation of reliable matching algorithms.

Figure 3:
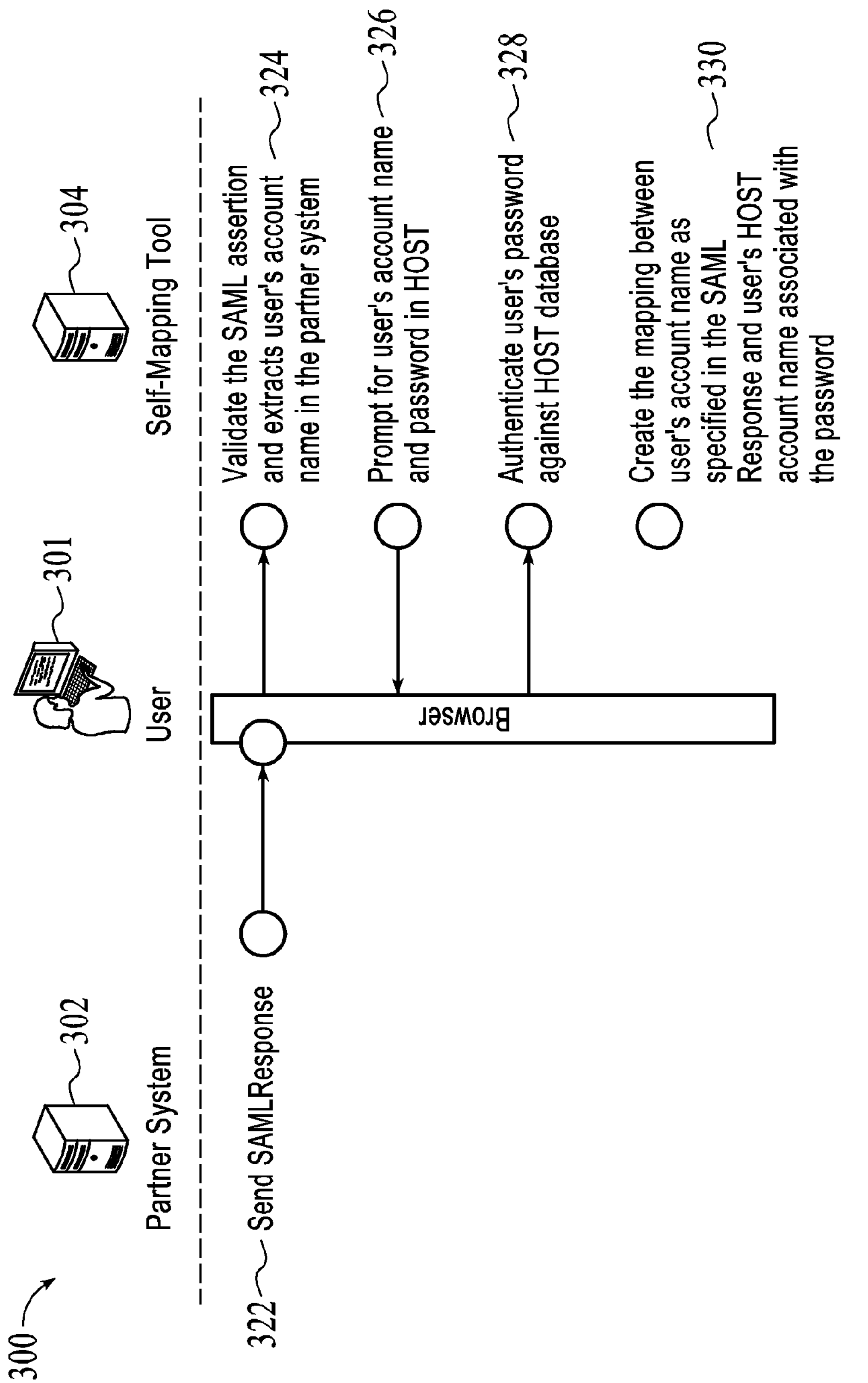
FIG. 3 is a flow diagram for interactions between users, partner systems, and the self-mapping application of the host system, under an embodiment.

Embodiments described herein enable the correlation of large numbers of account pairs in a reliable fashion because the embodiments automatically prompt users who own accounts in the host system and partner systems to self-map by establishing a connection between accounts. The self-mapping described herein establishes a connection between accounts, and FIG. 3 is a flow diagram for interactions 300 between users 301, partner systems 302, and the self-mapping application 304 of the host system, under an embodiment. The self-mapping application 304 is a component of or, alternatively, coupled or connected to a host system that includes sensitive data and/or applications and, as such, protects the data and/or applications from unauthorized access. The partner system 302 (identity provider) generates a SAML assertion 322 (e.g., SAMLResponse query string parameter), and propagates the SAML assertion to the self-mapping application 304, as described above. Upon receiving the SAML assertion the self-mapping application 304 validates 324 the SAML assertion using a public key provided by the partner platform or application 302 through which the user is accessing the host system, and extracts the user's account name or account information corresponding to the partner system 302. Using the account name of the partner system 302, the self-mapping application 304 prompts 326 the user for his/her account name and password in the host system. In response to receipt of the account name and password of the user in the host system, the self-mapping application 304 authenticates 328 the password against the host system database. The self-mapping application 304 generates or creates 330 the mapping between the user's account name as specified in the SAML response and the host system account name of the user associated with the password.

The single sign-in login protocol 200 of an embodiment includes self-mapping that establishes a connection between accounts of the partner system and the host system. With reference to FIGS. 2 and 3, the user 201 navigates to an application of the partner system 202P and selects a link to a host system application 202H. The host system application 202H to which the user is attempting access is a protected application and/or data of the host system. In an embodiment the application 202H is a web application and the user accesses the web application 202H via a browser 206, but the embodiment is not so limited. In response to selection of the link to the host system, the partner system application 202P takes the user to an identity provider page (e.g., uniform resource locator (URL). The identity provider generates a SAML assertion, and propagates the SAML assertion to the login server of the host system using a SAMLResponse query string parameter.

Upon receiving the SAML assertion the login server 204 validates the SAML assertion using a public key provided by the partner platform or application 202P through which the user is accessing the host system, and extracts the user's account name corresponding to the partner system. Using the account name of the partner system, the login server 204 prompts the user for his/her account name and password in the host system. In response to receipt of the account name and password of the user in the host system, the login server 204 authenticates the password against the host system database. The login server 204 generates or creates the mapping between the user's account name as specified in the SAML response and the host system account name of the user associated with the password. Following validation of the SAML assertion and creation of the mapping, the login server 204 redirects back to the partner system application 202P with a success message. In response to receipt of the success message by the partner system application 202P, the user is taken to the host system application 202H and presented the requested page.

In the event the login server 204 is unable to validate the SAML assertion or complete the mapping, the login server 204 redirects back to the partner system application 202P with an error message. In response to receipt of the error message by the partner system application 202P, the user is presented the error message.

An example is provided for a host system including the single sign-on with self-mapping, where the host system is a web service that allows vehicle record creation for users that are vehicle dealers having an account with the host system. In this example, the host system and partner systems are integrated to enable creation of vehicle records in the host system upon click on a button or a link in the partnering system. Creation of a vehicle record is the first step in the listing of vehicles in the host system sales venues. The web service provided by the host system receives as input vehicle information (e.g., VIN number, description, year, make, model, etc.) and the unique identifier of a listing user's account in the host systems. This is a challenge in typical partner systems that use the service of the host system because the partner systems do not have the host system identifier of the user's account with the host system. However, the single sign-on with self mapping of an embodiment overcomes this deficiency as described above.

The example starts with the user logging into the partner system and navigating to the web page that includes a link or button to the vehicle listing with the host system. Upon selection of the link, the partner system initiates a call to the vehicle record creation web service of the host system and passes to the host system the user's unique identifier in the partner system. The host system responds to the web service call with a special error code that indicates failure to create a vehicle record due to the absence of mapping information.

Receipt of the special error code at the partner system indicates to the partner system that the user is not mapped in the host system and is to be directed to the self-mapping application. The partner system redirects the user browser (e.g., issues HTTP redirection), which causes the browser to navigate to the host system self-mapping screen. Along with the redirection, the partner system includes a SAML assertion (e.g., SAMLResponse) that asserts the user's identity in the partner system, and a special parameter, referred to as RelayState. The special parameter includes a uniform resource locator (URL) of a web page to which the user will be directed upon successful self-mapping.

Once on the self-mapping page, the user is prompted for her/his account name and password in the host system. The page also includes guidance the user in the event the user does not have an account in the host system.

If the user provides a valid combination of host system account name and password, the self-mapping application establishes a logical link between the account name corresponding to the user in the partner system and the corresponding account name in the host system. Once the link is established between the accounts of the partner system and the host system, the user is taken to the web address that was specified in the RelayState parameter. In this example, the web address is the web address of the web page of the host system that includes a link or a button for vehicle listing with the host system. Upon reaching the web page of the host system that includes the vehicle listing link and selecting the link, a call is triggered to the host system vehicle record creation service. As a result of the linking information between the user accounts in the partner system and the host system created and stored by the self-mapping application, the call succeeds and initiates creation of a vehicle record.

It is not unusual for host system users (e.g., dealers) to represent multiple dealer organizations. Therefore, user accounts in the host system are coupled or connected to all organizations that a user represents. Generally, upon login to the host system users are asked to choose an organization that they will represent during the interactive session with the host system. However, if a user navigates to the host system from an integrated partner application, the organization selection prompt is not displayed because it could impact the seamlessness of the user experience. Thus, an alternative embodiment of the self-mapping application supports users who are members of multiple organizations by determining if the account name of the user is associated with more than one organization.

Under this alternative embodiment, the user logs into the partner system and navigates to the web page that includes a link or button to the vehicle listing with the host system. Upon selection of the link, the partner system initiates a call to the vehicle record creation web service of the host system and passes to the host system the user's unique identifier in the partner system. The host system responds to the web service call with a special error code that indicates failure to create a vehicle record due to the absence of mapping information.

Receipt of the special error code at the partner system indicates to the partner system that the user is not mapped in the host system and is to be directed to the self-mapping application. The partner system redirects the user browser (e.g., issues HTTP redirection), which causes the browser to navigate to the host system self-mapping screen. Along with the redirection, the partner system includes a SAML assertion (e.g., SAMLResponse) that asserts the user's identity in the partner system, and a special parameter, referred to as RelayState. The special parameter includes a uniform resource locator (URL) of a web page to which the user will be directed upon successful self-mapping.

Once on the self-mapping page, the user is prompted for her/his account name and password in the host system. The page also includes guidance the user in the event the user does not have an account in the host system.

If the user provides a valid combination of host system account name and password, the self-mapping application establishes a logical link between the account name corresponding to the user in the partner system and the corresponding account name in the host system. Additionally, the self-mapping application determines if the account name is associated with more than one organization. If the account name is associated with more than one organization, the self-mapping application prompts the user to select the organization that he/she is representing during the session. The information on the organization selected by the user is stored in the mapping record along with the mapping information. Subsequent attempts to navigate to host system from a given partner system do not trigger an organization selection prompt as the selection of an organization is read from the mapping record stored in the host system database.

Once the link is established between the accounts of the partner system and the host system, the user is taken to the web address that was specified in the RelayState parameter. This web address corresponds to the web page of the host system that includes a link or a button for vehicle listing with the host system. Upon reaching the web page of the host system that includes the vehicle listing link and selecting the link, a call is triggered to the host system vehicle record creation service. As a result of the linking information between the user accounts in the partner system and the host system created and stored by the self-mapping application, the call succeeds and initiates creation of a vehicle record.

In order to establish SAML integration with the host system, the partner systems implement an application that generates digitally signed SAML assertions and passes or transfers them to the host system in a SAMLResponse token. The host system interprets SAML assertions satisfying the following requirements: provide user's account name in the partner system according to a first format (e.g., urn:oasis:names:tc:SAML:1.1:nameid-format:WindowsDomainQualifiedName) or a second format (e.g., urn:oasis:names:tc:SAML:1.1:nameid-format:emailAddress); use HTTP Redirect SAML binding; assertions or surrounding SAML messages are digitally signed but not encrypted.

Figure 4:
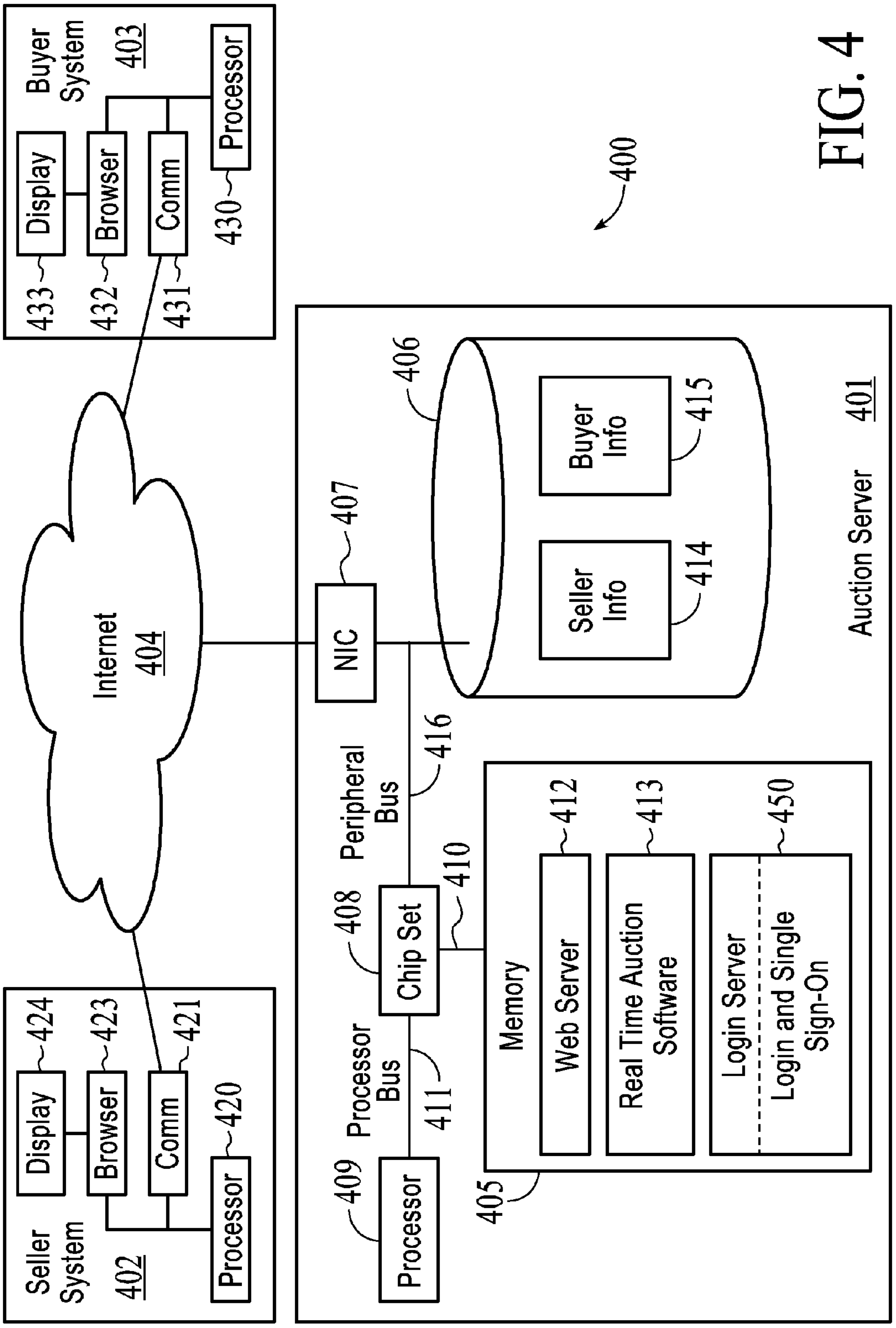
FIG. 4 is a block diagram of an electronic auction system that is an example of a host system used by equipment dealers or sellers, under an embodiment.

As one example of a host system that includes or couples to the login server and self-mapping application of an embodiment, FIG. 4 is a block diagram of an electronic auction system 400 that is an example of a host system used by equipment dealers or sellers, under an embodiment. The equipment of an embodiment includes vehicles or motor vehicles, but the auction system 400 is not limited to vehicles. The dealers or sellers access the host system via a partner system of their dealership using the system login and single sign-on 450 described herein. Other tools and network configurations may be used according to other embodiments. The example system 400 includes an auction server 401, seller system 402, and buyer system 403. Auction server 401 is coupled to seller system 402 and buyer system 403 through Internet 404. Auction sever 401 includes a processor 409 for processing instructions. Processor 409 is coupled to chip set 408 by a processor bus 411. Chip set 408 is coupled to memory 405 by a memory bus 410 and manages access to memory 405 by processor 409. Chip set 408 is also coupled to peripheral bus 416. Peripheral bus 416 can comprise, for example, PCI, PCI-X, PCI Express, or other peripheral bus protocols. Auction server 401 also includes one or more network interface cards 407 coupled to peripheral bus 416 for providing network interfaces to network, such as Internet 404. Storage 406 (e.g., a disk array, other non-voltage storage, etc.) is also coupled to peripheral bus 416.

According to various embodiments, memory 405 and/or storage 406 may include various forms of storage or computer-readable memories such as, but not limited to, volatile memory (random access memory (RAM), non-volatile memory (read-only memory (ROM)), EEPROM, disk, and/or other storage devices that may include one or more of magnetic, optical storage, or other media. The memory and/or storage on the auction server may be configured as a RAID (Redundant Array of Independent Disks) configuration to provide high reliability access to software and data.

One or more applications or software are stored in memory 405 to provide the system login and single sign-on 450 as described herein as well as other functions of the auction system 400. The other functions of the auction system 400 include, for example, a web server 412 and real-time auction software 413 stored in memory 405 and running on processor 409. Web server 412 provides web pages for the users to interact with in order to be provided with auction functions. For example, web server 412 may serve up web pages to seller system 402 and buyer system 403 in order to allow seller system 402 and buyer system 403 to view events and auction items to make bids and to participate in auctions. Storage 406 includes information about respective users, such as seller information 414 and buyer information 415. This information is used in order to support the system login and single sign-on 450 and to manage the inventory of items for sale, configuration of auction events, and the processing of real-time action functions. According to various embodiments, auction system 400 may include one or a plurality of auction servers 401 in various configurations and architectures to provide auctions and bidding functionality.

Seller system 402 and/or buyer system 403 may comprise computer systems coupled to a network such as Internet 404 according to an embodiment. As shown, seller system 402 includes processor 420 and software components such as browser 423 and communications software 421. Also included is a display 424 that allows a user to access and view the system login and single sign-on 450 prompts as well as information regarding auctions and to perform related administration. Buyer system 403 also includes a processor 430, communication software 431, browser 432, and display 433. Various browser software or other software or functionality to provide user interaction may be used in buyer and seller systems. For example, browsers may include, but are not limited to, Internet Explorer, Netscape browser, Firefox browser, Safari browser or other browser. Alternatively, other user interface software not including a browser may be used.

Software such as web server 412, real-time auction software 413, and system login and single sign-on 450 may be stored in storage 406 or other storage and may be loaded into memory 405 for manipulation by processor 409 according to an embodiment. Portions of data such as seller information 414 and buyer information 415 may be loaded into data structures in memory 405 or other storage for manipulation by processor 409 in accordance with software such as web server 412 and real-time auction software 413. Web server 412 includes an operating system for managing system resources, such as Microsoft Windows XP, 2000, 98, or NT, Apple OS, Linux, or other operating systems as well as applications software running on top of the operating systems for implementing an HTML server or other server. Information stored in storage 406 may be stored in various fauns of database arrangements and may contain cross references or links to one another to allow information to be queried and retrieved. In an example embodiment, the information is stored in databases, such as relational databases, and may be queried using structured query language (SQL) or other mechanism.

The system may include a secure connection or connections. For example, in an embodiment, the entire bidding operation of the system operates on a secure connection or connections. Various different technologies may be used to provide a secure connection, such as encryption with, for example, public key and private key encryption. The system may be set up over a virtual private network (VPN).

In an example embodiment, a seller operates seller system 402 through browser 423, communications software 421, and display 424 to set up seller inventory and seller events in seller information storage 414. The seller-user also manages the events and bidding through seller system 402, which communicates via Internet 404 with web server 412.

Buyer system 403 interacts with a buyer user, allowing the buyer user to view items and events including the items for auction. The interaction is provided to the buyer user through display 433, browser 432, and communications software 431, which are controlled by processor 430. Buyer system in turn communicates with auction server 401 via Internet 404. Web server 412 in turn provides buyer system 403 with graphical interface pages which may be displayed on display 433. Components and functions of the electronic auction system 400 are described further in the Related Applications described above.

Embodiments described herein include a method comprising receiving at a first application of a first system a request to access a protected application of a second system. The method comprises generating in response to the request an assertion that asserts an identity in the first system of a user generating the request. The method comprises validating the assertion and extracting first account information corresponding to the assertion. The first account information is information of a first account of the user in the first system. The method comprises determining second account information that is information of a second account of the user in the second system. The method comprises generating a mapping between the first account and the second account using the first account information and the second account information.

Embodiments described herein include a method comprising: receiving at a first application of a first system a request to access a protected application of a second system; generating in response to the request an assertion that asserts an identity in the first system of a user generating the request; validating the assertion and extracting first account information corresponding to the assertion, wherein the first account information is information of a first account of the user in the first system; determining second account information that is information of a second account of the user in the second system; and generating a mapping between the first account and the second account using the first account information and the second account information.

The method of an embodiment comprises providing access to the protected application by the user via the mapping.

The second system of an embodiment is remote to the first system.

The generating of the assertion of an embodiment is performed at the first system.

The generating of the assertion of an embodiment uses security assertion markup language.

The method of an embodiment comprises generating a query string parameter in response to the request, wherein the query string parameter includes the assertion.

The method of an embodiment comprises generating the query string parameter to include a uniform resource locator corresponding to an electronic location of the protected application.

The method of an embodiment comprises, following the mapping, redirecting the user to the protected application using the uniform resource locator.

The method of an embodiment comprises generating the query string parameter at the first system and propagating the query string parameter to the second system.

The validating of an embodiment is performed at the second system using a key provided by the first system.

The determining the second account information of an embodiment comprises, in response to the first account information, generating a prompt for the second account information.

The generating the mapping of an embodiment comprises generating the mapping in response to receipt of the second account information.

The method of an embodiment comprises authenticating the second account information prior to the generating of the mapping.

The method of an embodiment comprises determining that the second account information is associated with a plurality of organizations and prompting the user to select an organization of the plurality of organizations.

The method of an embodiment comprises generating the mapping to include the organization selected.

The mapping of an embodiment comprises generating a logical link between the first account information and the second account information.

The method of an embodiment comprises storing the mapping in the second system.

The first account information of an embodiment comprises an account name of the first account in the first system.

The second account information of an embodiment comprises an account name of the second account in the second system.

The second account information of an embodiment comprises a password corresponding to the second account.

The method of an embodiment comprises authenticating the password prior to the generating of the mapping.

Embodiments described herein include a method comprising receiving at a first application of a first system a request to access a protected application of a second system. The method comprises generating an assertion in response to the request. The assertion asserts an identity in the first system of a user generating the request. The method comprises validating the assertion and extracting first account information corresponding to the assertion. The first account information is information of a first account of the user in the first system. The method comprises, in response to the first account information, generating a prompt for second account information that is information of a second account of the user in the second system. The method comprises generating a mapping between the first account and the second account in response to receipt of the second account information. The mapping uses the first account information and the second account information.

Embodiments described herein include a method comprising: receiving at a first application of a first system a request to access a protected application of a second system; generating an assertion in response to the request, wherein the assertion asserts an identity in the first system of a user generating the request; validating the assertion and extracting first account information corresponding to the assertion, wherein the first account information is information of a first account of the user in the first system; in response to the first account information, generating a prompt for second account information that is information of a second account of the user in the second system; and generating a mapping between the first account and the second account in response to receipt of the second account information, wherein the mapping uses the first account information and the second account information.

Embodiments described herein include a method comprising receiving at a partner system a request to access a protected application of a host system. The partner system is remote to the host system. The method comprises generating a query string parameter in response to the request. The query string parameter includes an assertion of an identity in the partner system of a user generating the request. The method comprises propagating the query string parameter to an access application and validating the assertion using a key provided by the partner system. The method comprises extracting first account information corresponding to the assertion. The first account information is information of a partner system account corresponding to the user. The method comprises generating a prompt for second account information that is information of a host system account corresponding to the user. The method comprises generating a logical link between the first account information and the second account information in response to receipt of the second account information. The method comprises providing access to the protected application by the user via the logical link.

Embodiments described herein include a method comprising: receiving at a partner system a request to access a protected application of a host system, wherein the partner system is remote to the host system; generating a query string parameter in response to the request, wherein the query string parameter includes an assertion of an identity in the partner system of a user generating the request; propagating the query string parameter to an access application and validating the assertion using a key provided by the partner system; extracting first account information corresponding to the assertion, wherein the first account information is information of a partner system account corresponding to the user; generating a prompt for second account information that is information of a host system account corresponding to the user; generating a logical link between the first account information and the second account information in response to receipt of the second account information; and providing access to the protected application by the user via the logical link.

Embodiments described herein include a method comprising receiving at a first application of a first system a request to access a protected application of a second system. The method comprises generating an assertion in response to the request. The assertion asserts an identity in the first system of a user generating the request. The method comprises validating the assertion and extracting first account information corresponding to the assertion. The first account information is information of a first account of the user in the first system. The method comprises, in response to the first account information, generating a prompt for second account information that is information of a second account of the user in the second system. The method comprises receiving the second account information and determining that the second account information is associated with a plurality of organizations. The method comprises determining an organization of the plurality of organizations with which the user is affiliated for purposes of the request. The method comprises generating a mapping between the first account and the second account in response to receipt of the second account information. The mapping uses the first account information and the second account information and includes the organization.

Embodiments described herein include a method comprising: receiving at a first application of a first system a request to access a protected application of a second system; generating an assertion in response to the request, wherein the assertion asserts an identity in the first system of a user generating the request; validating the assertion and extracting first account information corresponding to the assertion, wherein the first account information is information of a first account of the user in the first system; in response to the first account information, generating a prompt for second account information that is information of a second account of the user in the second system; receiving the second account information and determining that the second account information is associated with a plurality of organizations; determining an organization of the plurality of organizations with which the user is affiliated for purposes of the request; and generating a mapping between the first account and the second account in response to receipt of the second account information, wherein the mapping uses the first account information and the second account information and includes the organization.

Embodiments described herein include a system comprising a first application of a first system coupled to a second application of a second system. The first application receives a request for access to the second application and in response generates an assertion that asserts an identity in the first system of a user corresponding to the request. An access application coupled to the first application and the second application receives and validates the assertion and extracts first account information corresponding to the assertion. The first account information is information of a first account of the user in the first system. The access application determines second account information that is information of a second account of the user in the host system. The access application generates a mapping between the first account and the second account using the first account information and the second account information.

Embodiments described herein include a system comprising a first application of a first system coupled to a second application of a second system, wherein the first application receives a request for access to the second application and in response generates an assertion that asserts an identity in the first system of a user corresponding to the request, wherein an access application coupled to the first application and the second application receives and validates the assertion and extracts first account information corresponding to the assertion, wherein the first account information is information of a first account of the user in the first system, wherein the access application determines second account information that is information of a second account of the user in the host system, wherein the access application generates a mapping between the first account and the second account using the first account information and the second account information.

The access application of an embodiment provides access to the second application by the user via the mapping.

The second system of an embodiment is remote to the first system.

The first application of an embodiment generates the assertion using security assertion markup language.

In response to the request, the first application of an embodiment generates a query string parameter that includes the assertion.

The query string parameter of an embodiment includes a uniform resource locator corresponding to an electronic location of the second application.

The access application of an embodiment, following the mapping, redirects the user to the second application using the uniform resource locator.

The access application of an embodiment validates the assertion using a key provided by the first system.

In response to the first account information, the access application of an embodiment determines the second account information by generating a prompt for the second account information.

The access application of an embodiment generates the mapping in response to receipt of the second account information.

The access application of an embodiment authenticates the second account information prior to the generating of the mapping.

The access application of an embodiment determines that the second account information is associated with a plurality of organizations and prompts the user to select an organization of the plurality of organizations.

The access application of an embodiment generates the mapping to include the organization selected.

The access application of an embodiment generates the mapping by generating a logical link between the first account information and the second account information.

The mapping of an embodiment is stored.

The first account information of an embodiment comprises an account name of the first account in the first system.

The second account information of an embodiment comprises an account name of the second account in the second system.

The second account information of an embodiment comprises a password corresponding to the second account.

The access application of an embodiment authenticates the password prior to the generating of the mapping.

Embodiments described herein include a system comprising a processor running an access application that receives an assertion from a first system. The assertion is generated in response to a request to access a protected component of a second system. The assertion asserts an identity in the first system of a user corresponding to the request. The access application validates the assertion and extracts first account information corresponding to the assertion. The first account information is information of a first account of the user in the first system. The access application determines second account information that is information of a second account of the user in the second system. The application generates a mapping between the first account and the second account using the first account information and the second account information and provides access to the protected component via the mapping.

Embodiments described herein include a system comprising a processor running an access application that receives an assertion from a first system, wherein the assertion is generated in response to a request to access a protected component of a second system, wherein the assertion asserts an identity in the first system of a user corresponding to the request, wherein the access application validates the assertion and extracts first account information corresponding to the assertion, wherein the first account information is information of a first account of the user in the first system, wherein the access application determines second account information that is information of a second account of the user in the second system, wherein the application generates a mapping between the first account and the second account using the first account information and the second account information and provides access to the protected component via the mapping.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term “processor” as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words “comprise,” “comprising,” and the like are to be construed in an inclusive sense as opposed to an exclusive or exhaustive sense; that is to say, in a sense of “including, but not limited to.” Words using the singular or plural number also include the plural or singular number respectively. Additionally, the words “herein,” “hereunder,” “above,” “below,” and words of similar import refer to this application as a whole and not to any particular portions of this application. When the word “or” is used in reference to a list of two or more items, that word covers all of the following interpretations of the word: any of the items in the list, all of the items in the list and any combination of the items in the list.

The above description of embodiments is not intended to be exhaustive or to limit the systems and methods described to the precise form disclosed. While specific embodiments and examples are described herein for illustrative purposes, various equivalent modifications are possible within the scope of other systems and methods, as those skilled in the relevant art will recognize. The teachings provided herein can be applied to other processing systems and methods, not only for the systems and methods described above.

The elements and acts of the various embodiments described above can be combined to provide further embodiments. These and other changes can be made to the embodiments in light of the above detailed description.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope is to be determined entirely by the claims.

While certain aspects of the systems and methods are presented below in certain claim forms, the inventors contemplate the various aspects of the systems and methods in any number of claim forms. Accordingly, the inventors reserve the right to add additional claims after filing the application to pursue such additional claim forms for other aspects of the systems and methods.

What is claimed is:

1. A method comprising:

receiving at a first application of a first system a request to access a protected application of a second system, the first application and the protected application running on at least one hardware processor;

generating in response to the request an assertion that asserts an identity in the first system of a user generating the request;

validating the assertion and extracting first account information corresponding to the assertion, wherein the first account information is information of a first account of the user in the first system, the first account information including a unique identifier of the user in the first system;

determining second account information that is information of a second account of the user in the second system, the determining the second account information including using the first account information to prompt for credentials of the user in the second account and authenticating the credentials in the second system; and generating a mapping between the first account of the user and the second account of the user using the first account information and the second account information.

2. The method of claim 1, comprising providing access to the protected application by the user via the mapping.

3. The method of claim 1, wherein the second system is remote to the first system.

4. The method of claim 1, wherein the generating of the assertion is performed at the first system.

5. The method of claim 1, wherein the generating of the assertion uses security assertion markup language.

6. The method of claim 1, comprising generating a query string parameter in response to the request, wherein the query string parameter includes the assertion.

7. The method of claim 6, comprising generating the query string parameter to include a uniform resource locator corresponding to an electronic location of the protected application.

8. The method of claim 7, comprising, following the mapping, redirecting the user to the protected application using the uniform resource locator.

9. The method of claim 6, comprising generating the query string parameter at the first system and propagating the query string parameter to the second system.

10. The method of claim 1, wherein the validating is performed at the second system using a key provided by the first system.

11. The method of claim 1, wherein the determining the second account information comprises, in response to the first account information, generating a prompt for the second account information.

12. The method of claim 1, wherein the generating the mapping comprises generating the mapping in response to receipt of the second account information.

13. The method of claim 1, comprising authenticating the second account information prior to the generating of the mapping.

14. The method of claim 13, comprising determining that the second account information is associated with a plurality of organizations and prompting the user to select an organization of the plurality of organizations.

15. The method of claim 14, comprising generating the mapping to include the organization selected.

16. The method of claim 1, wherein the mapping comprises generating a logical link between the first account information and the second account information.

17. The method of claim 1, comprising storing the mapping in the second system.

18. The method of claim 1, wherein the first account information comprises an account name of the first account in the first system.

19. The method of claim 1, wherein the second account information comprises an account name of the second account in the second system.

20. The method of claim 19, wherein the second account information comprises a password corresponding to the second account.

21. The method of claim 20, comprising authenticating the password prior to the generating of the mapping.

22. A method comprising:

receiving at a first application of a first system a request to access a protected application of a second system, the first application and the protected application running on at least one hardware processor;

generating an assertion in response to the request, wherein the assertion asserts an identity in the first system of a user generating the request;

validating the assertion and extracting first account information corresponding to the assertion, wherein the first account information is information of a first account of the user in the first system, the first account information including a unique identifier of the user in the first system;

in response to the first account information, using the first account information to generate a prompt for second account information that is information of a second account of the user in the second system, the second account information including credentials of the user;

authenticating the credentials in the second system; and generating a mapping between the first account of the user and the second account of the user in response to receipt of the second account information, wherein the mapping uses the first account information and the second account information.

23. A method comprising:

receiving at a partner system a request to access a protected application of a host system, wherein the partner system is remote to the host system, the partner system and the host system comprising one or more applications running on at least one hardware processor, the one or more applications including the protected application and an access application;

generating a query string parameter in response to the request, wherein the query string parameter includes an assertion of an identity in the partner system of a user generating the request;

propagating the query string parameter to the access application and validating the assertion using a key provided by the partner system;

extracting first account information corresponding to the assertion, wherein the first account information is information of a partner system account corresponding to the user;

using the first account information to generate a prompt for second account information that is information of a host system account corresponding to the user, the second account information including credentials of the user;

authenticating the credentials in the second system;

generating a logical link between the first account information and the second account information in response to receipt of the second account information; and providing access to the protected application by the user via the logical link.

24. A method comprising:

receiving at a first application of a first system a request to access a protected application of a second system, the first system and the second system comprising one or more applications running on at least one hardware processor, the one or more applications including the first application and the protected application;

generating an assertion in response to the request, wherein the assertion asserts an identity in the first system of a user generating the request;

validating the assertion and extracting first account information corresponding to the assertion, wherein the first account information is information of a first account of the user in the first system;

in response to the first account information, using the first account information to generate a prompt for second account information that is information of a second account of the user in the second system, the second account information including credentials of the user;

authenticating the credentials in the second system;

receiving the second account information and determining that the second account information is associated with a plurality of organizations;

determining an organization of the plurality of organizations with which the user is affiliated for purposes of the request; and generating a mapping between the first account and the second account in response to receipt of the second account information, wherein the mapping uses the first account information and the second account information and includes the organization.

25. A system comprising a first application of a first system coupled to a second application of a second system, the system comprising one or more applications running on at least one hardware processor, the one or more applications including the first application and the second application, wherein the first application receives a request for access to the second application and in response generates an assertion that asserts an identity in the first system of a user corresponding to the request, wherein an access application coupled to the first application and the second application receives and validates the assertion and extracts first account information corresponding to the assertion, wherein the first account information is information of a first account of the user in the first system, wherein the access application determines second account information that is information of a second account of the user in the host system, the determining the second account information including using the first account information to prompt for credentials of the user in the second account and authenticating the credentials in the second system, wherein the access application generates a mapping between the first account and the second account using the first account information and the second account information.

26. The system of claim 25, wherein the access application provides access to the second application by the user via the mapping.

27. The system of claim 25, wherein the second system is remote to the first system.

28. The system of claim 25, wherein the first application generates the assertion using security assertion markup language.

29. The system of claim 25, wherein, in response to the request, the first application generates a query string parameter that includes the assertion.

30. The system of claim 29, wherein the query string parameter includes a uniform resource locator corresponding to an electronic location of the second application.

31. The system of claim 30, wherein the access application, following the mapping, redirects the user to the second application using the uniform resource locator.

32. The system of claim 25, wherein the access application validates the assertion using a key provided by the first system.

33. The system of claim 25, wherein, in response to the first account information, the access application determines the second account information by generating a prompt for the second account information.

34. The system of claim 25, wherein the access application generates the mapping in response to receipt of the second account information.

35. The system of claim 25, wherein the access application authenticates the second account information prior to the generating of the mapping.

36. The system of claim 35, wherein the access application determines that the second account information is associated with a plurality of organizations and prompts the user to select an organization of the plurality of organizations.

37. The system of claim 36, wherein the access application generates the mapping to include the organization selected.

38. The system of claim 25, wherein the access application generates the mapping by generating a logical link between the first account information and the second account information.

39. The system of claim 25, wherein the mapping is stored.

40. The system of claim 25, wherein the first account information comprises an account name of the first account in the first system.

41. The system of claim 25, wherein the second account information comprises an account name of the second account in the second system.

42. The system of claim 41, wherein the second account information comprises a password corresponding to the second account.

43. The system of claim 42, wherein the access application authenticates the password prior to the generating of the mapping.

44. A system comprising a hardware processor running an access application that receives an assertion from a first system, wherein the assertion is generated in response to a request to access a protected component of a second system, wherein the assertion asserts an identity in the first system of a user corresponding to the request, wherein the access application validates the assertion and extracts first account information corresponding to the assertion, wherein the first account information is information of a first account of the user in the first system, wherein the access application determines second account information that is information of a second account of the user in the second system, the determining the second account information including using the first account information to prompt for credentials of the user in the second account and authenticating the credentials in the second system, wherein the application generates a mapping between the first account and the second account using the first account information and the second account information and provides access to the protected component via the mapping.

* * * * *